United States Patent
Park et al.

(10) Patent No.: US 11,906,073 B2
(45) Date of Patent: Feb. 20, 2024

(54) ACTUATOR FOR VEHICLE COOLANT CONTROL VALVE

(71) Applicant: INZICONTROLS CO., LTD., Siheung-si (KR)

(72) Inventors: Sang Hyoun Park, Siheung-si (KR); Taek Seung Kim, Seoul (KR); Eun Sang Cho, Ansan-si (KR); Han Sle Kim, Siheung-si (KR); Ki Hyun Kim, Ansan-si (KR)

(73) Assignee: INZICONTROLS CO., LTD., Siheung-si (KR)

( * ) Notice: Subject to any disclaimer, the term of this patent is extended or adjusted under 35 U.S.C. 154(b) by 0 days.

(21) Appl. No.: 17/845,097

(22) Filed: Jun. 21, 2022

(65) Prior Publication Data
US 2023/0407988 A1   Dec. 21, 2023

(51) Int. Cl.
*F16K 37/00* (2006.01)
*F16K 31/04* (2006.01)
*F01P 7/14* (2006.01)

(52) U.S. Cl.
CPC ............ *F16K 37/0041* (2013.01); *F01P 7/14* (2013.01); *F16K 31/047* (2013.01); *F01P 2007/146* (2013.01)

(58) Field of Classification Search
CPC ...... F16K 37/0041; F16K 31/047; F01P 7/14; F01P 2007/146
See application file for complete search history.

(56) References Cited

U.S. PATENT DOCUMENTS

2005/0023904 A1*  2/2005  Cara ................... H05K 9/0039
                                                                    310/10
2022/0049792 A1*  2/2022  Taupeau ................ F16K 31/042

FOREIGN PATENT DOCUMENTS

| CN | 203730890 U | 7/2014 |
|---|---|---|
| CN | 210566554 U | 5/2020 |
| JP | 2001-336587 A | 12/2001 |
| JP | 2003-189534 A | 7/2003 |
| JP | 2006-149134 A | 6/2006 |
| JP | 2019-68517 A | 4/2019 |
| KR | 10-0803816 B1 | 2/2008 |
| KR | 10-2012-0063189 A | 6/2012 |

(Continued)

OTHER PUBLICATIONS

Office Action dated Aug. 23, 2022 issued by the Korean Patent Office in Korean Application No. 10-2020-0180867.

(Continued)

*Primary Examiner* — Jacob M Amick
(74) *Attorney, Agent, or Firm* — Sughrue Mion, PLLC

(57) ABSTRACT

An actuator for a vehicle coolant control valve according to the present invention includes: a drive unit to generate driving power; an output unit to drive a control valve, which selectively opens/closes a coolant flow for a vehicle using the driving power provided by the drive unit; and a sensing unit to sense an output condition of the output unit, wherein the sensing unit is provided with a position sensor to sense a position of the output unit and an electro-magnetic compatibility (EMC) filter to filer EMC. According to the above configuration, a single printed circuit board may have a function of an EMC board and a function of a sensor board, which are advantageous in ensuring space and design freedom to thus contribute to improvement of control quality.

19 Claims, 6 Drawing Sheets

(56) References Cited

FOREIGN PATENT DOCUMENTS

| KR | 10-1500391 B1 | 3/2015 |
|---|---|---|
| KR | 10-1720785 B1 | 4/2017 |
| KR | 10-2017-0136506 A | 12/2017 |
| KR | 10-2239922 B1 | 4/2021 |

OTHER PUBLICATIONS

Office Action dated Apr. 12, 2022 issued by the Korean Patent Office in Korean Application No. 10- 2020-0180867.
Extended European Search Report dated Feb. 2, 2023 from the European Patent Office in EP Application No. 22180263.0.

* cited by examiner

[FIG. 1]
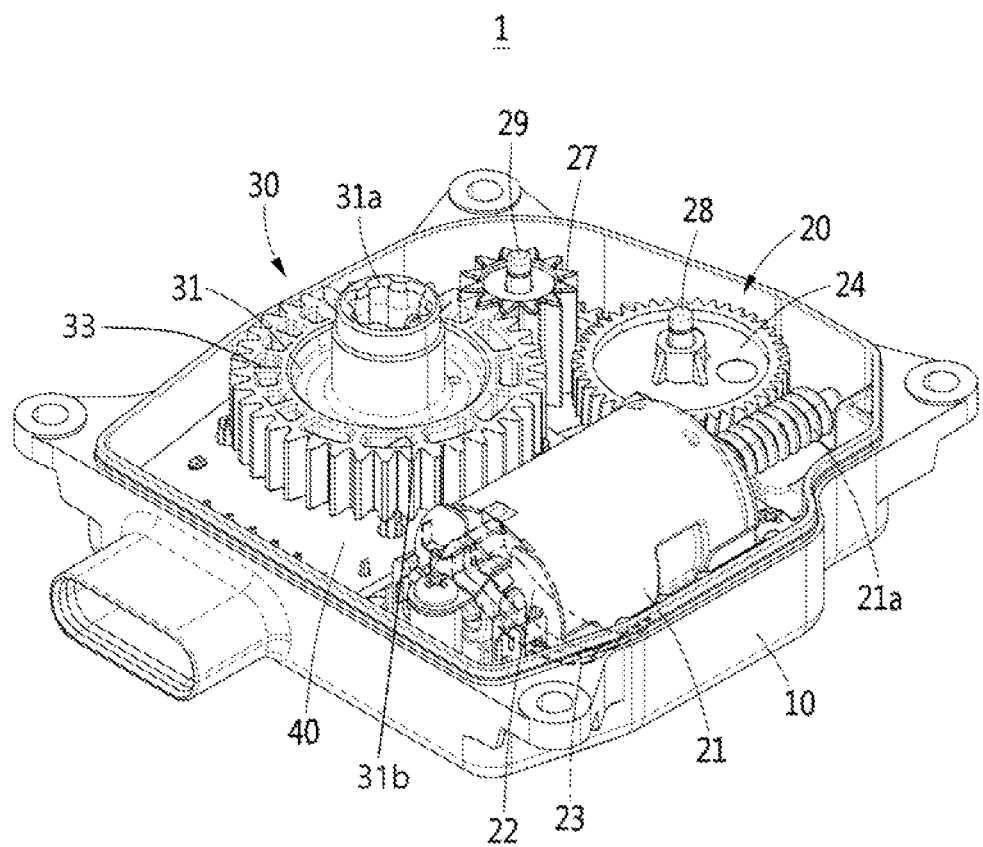

[FIG. 2]
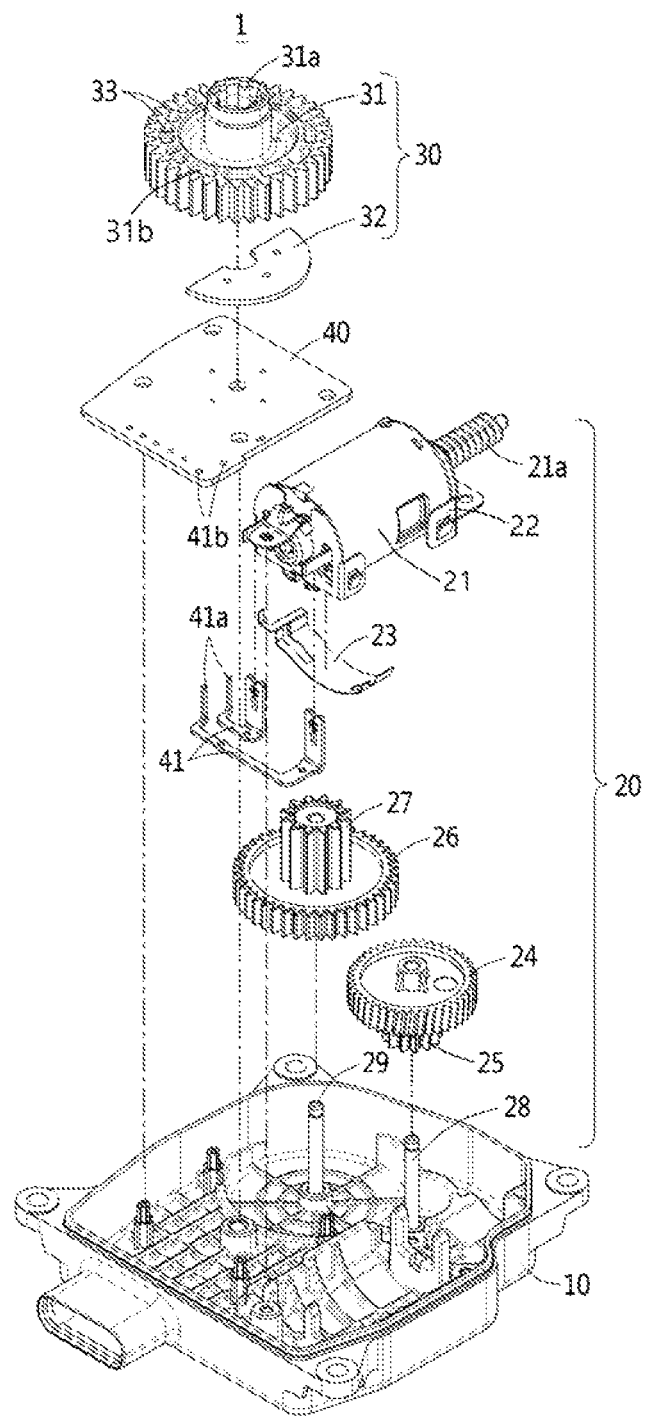

[FIG. 3]
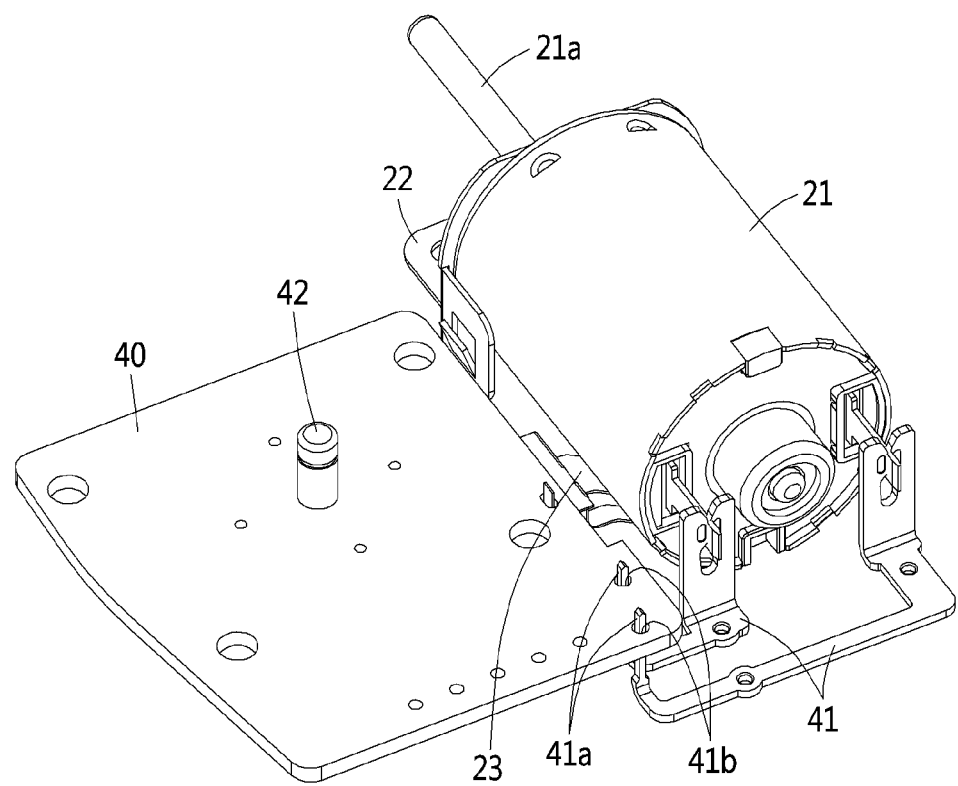

[FIG. 4]
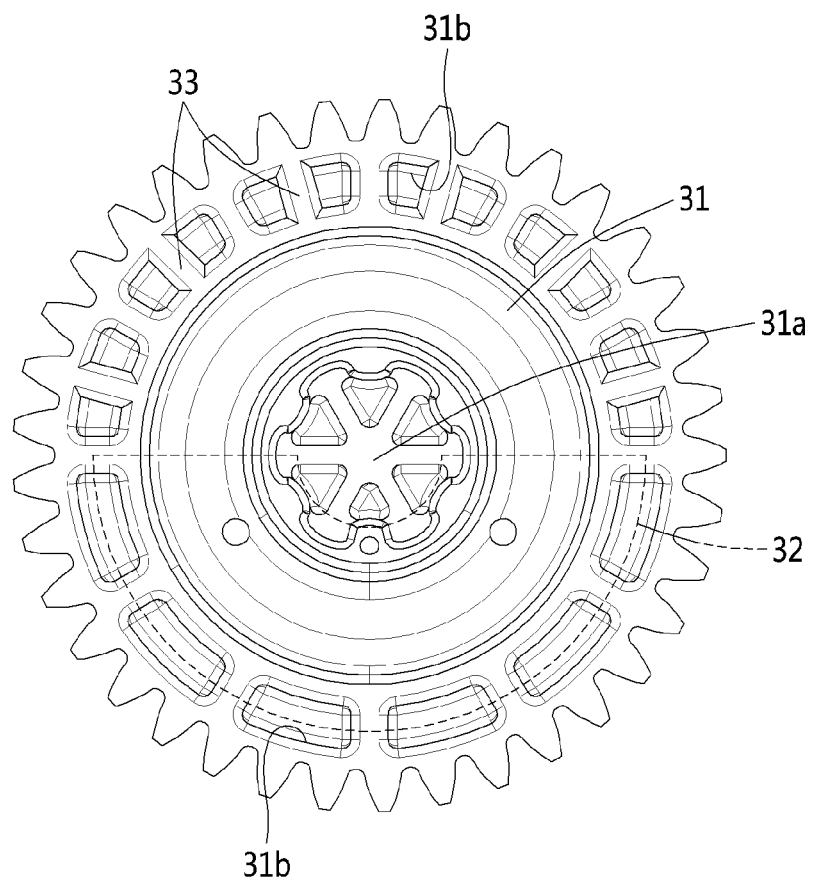

[FIG. 5]
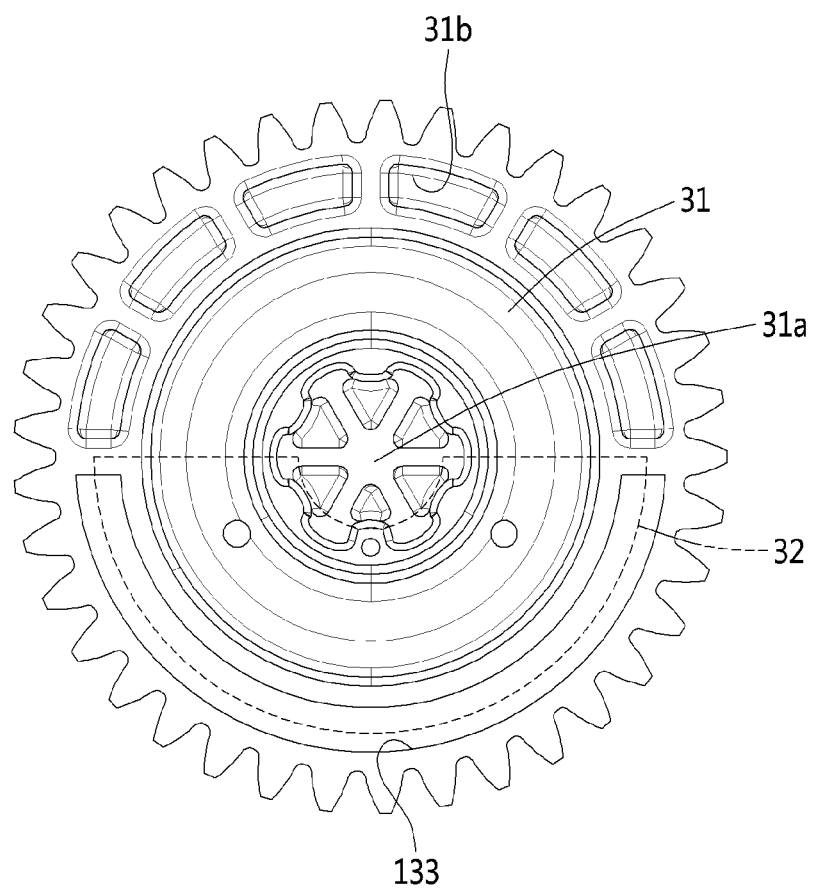

[FIG. 6]
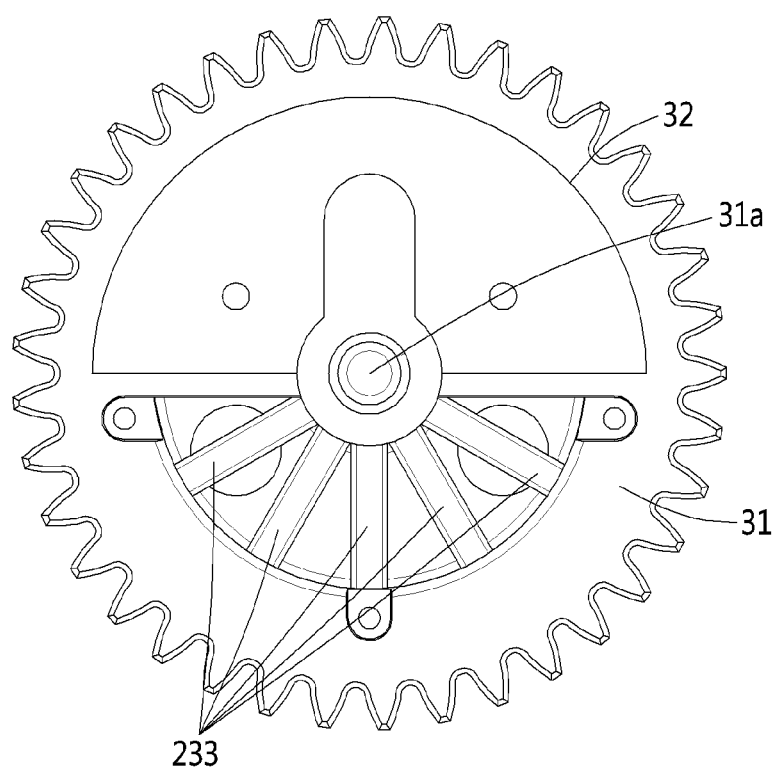

ACTUATOR FOR VEHICLE COOLANT CONTROL VALVE

TECHNICAL FIELD

The present invention relates to an actuator for a vehicle coolant control valve, and more particularly, to an actuator for a vehicle coolant control valve, in which a single control board can be ground-connected with components along with control of output performance, so as to achieve advantages in ensuring space freedom and design freedom.

BACKGROUND ART

A vehicle driven by an engine, which is an internal combustion engine, is equipped with different valves therein, and these valves are configured to distribute, control or regulate a variety of fluid streams according to applications such as engine cooling, indoor space cooling/heating, exhaust gas recirculation (EGR), etc. In particular, a control valve built in the vehicle may be provided in a multi-valve form in order to control a coolant flow circulating the inside/outside of the engine in multiple directions.

The control valve equipped in the vehicle is typically provided with an inductive sensor, which is one of proximity sensors sensing operation of the control valve, in order to change a direction of the coolant or regulate a flow rate. Such an inductive sensor is provided to be communicated with an output shaft of an actuator connected to the control valve, thereby enabling real-time sensing the output condition of the actuator.

Meanwhile, a printed circuit board connected to the inductive sensor to sense and control the operation of the control valve is separately provided from an EMC board of a motor and causes limitation in designing the same. Accordingly, in recent years, studies for improving output control performance of the control valve while enhancing design freedom are continuously being required.

PRIOR ART LITERATURE

[Patent Document]
Korean Patent Laid-Open Publication No. 10-2017-0136506
Korean Patent Publication No. 10-1500391

DISCLOSURE

Technical Problem

An object of the present invention is to provide an actuator for a vehicle coolant control valve that ensures space and design freedoms of components for controlling a flow of coolant, thereby improving control efficiency.

Another object of the present invention is to provide an actuator for a vehicle coolant control valve that prevents output unbalance due to a sensing configuration to sense output of the actuator, thereby securing uniform sensing sensitivity.

Technical Solution

In order to achieve the above objects, the actuator for a vehicle coolant control valve according to the present invention may include: a drive unit to generate driving power; an output unit to drive a control valve, which selectively opens/closes ("switches") a coolant flow for a vehicle using the driving power provided by the drive unit; and a sensing unit to sense an output condition of the output unit, wherein the sensing unit is provided with a position sensor to sense a position of the output unit and an electro-magnetic compatibility (EMC) filter to filer EMC.

Further, the drive unit may include a driving source which is prepared to be adjacent to the sensing unit and has a cylindrical shape, and at least one transfer gear which is connected to the driving source to reduce a speed of the driving power and transfer the same to the output unit.

Further, the driving source may be supported on a ground plate having a rounding shape, and may have at least two ground contact points when the driving source is compressed to the ground plate, wherein one side thereof may be ground-connected to the sensing unit.

Further, the output unit may include an output gear that rotates around an output shaft by the driving power of the drive unit, wherein one side of the output shaft is fixed in the center of the position sensor by a fastening pin, while the other side may be connected to the control valve.

Further, the output unit may include: the output gear that rotates around the output shaft by the driving power of the drive unit; and an interference member, which is prepared to partially cover one surface of the output gear and to thus face the sensing unit and is communicated with rotation of the output gear, wherein the output gear and the interference member may be made of different materials from each other.

Further, in order to compensate mass unbalance between an interference region in which the interference member of the output gear is present and a non-interference region in which the above interference member is not provided, at least one balance member may be provided in the output gear.

Further, the output gear may be formed of a plastic material while the interference member may be formed to cover a part of the region at one side of the one surface of the output gear. Further, in order to compensate a difference between a mass at one side of the output gear, on which the interference member is present, and a mass at the other side of the output gear, on which the interference member is not provided, at least one balance member may be provided at the other side of the output gear.

Further, the balance member may include a plurality of ribs that are extended in a diameter direction to adjoin one another at the other side of the other surface of the output gear, on which the interference member is not provided.

Further, the balance member may include a plurality of ribs that are extended in a diameter direction to adjoin one another at the other side of the one surface of the output gear, thereby being adjacent to the interference member.

Further, the output gear may be formed of a plastic material while the interference member may be formed to cover a part of the region at one side of the one surface of the output gear. Further, a balance member may be provided on one surface or the other surface of the output gear, wherein the balance member is prepared in a groove form inserted in a predetermined depth at one side overlapped with the interference member.

Further, the balance member may be provided to extend in a circumferential direction overlapped with the interference member.

Further, the sensing unit may include one printed circuit board in which the position sensor and the EMC filter are present, while the driving source may be connected to the printed circuit board through a connection line and thus can be connected to an external power supply.

The actuator for a vehicle coolant control valve to control a coolant flow according to one embodiment of the present invention may include: a drive unit to generate driving power; an output unit which is connected to the drive unit and drives a control valve using the driving power; and a sensing unit including a printed circuit board to sense an output condition of the output unit, wherein a position sensor to sense a position of the output unit and an electro-magnetic compatibility (EMC) filter to filer EMC share the above one printed circuit board of the sensing unit.

Further, the drive unit may include: a driving source, which is provided to be adjacent to the printed circuit board so as to be electrically connected to the printed circuit board and to generate the driving power; and at least one transfer gear, which is connected to the driving source to reduce a speed of the driving power and transfer the same to the output unit, wherein the driving source is connected to the printed circuit board through a connection line, thereby being connected to an external power supply.

Further, the driving source may be supported to a ground plate having a rounding shape and may have at least two ground contact points when the driving source is compressed to the ground plate, wherein one side thereof is connected to the printed circuit board.

Further, the output unit may include: an output gear that rotates around an output shaft by the driving power of the drive unit; and the interference member, which is prepared to partially cover one surface of the output gear to thus face the printed circuit board and is communicated with rotation of the output gear, wherein the output gear and the interference member may be made of different materials from each other.

Further, one side of the output shaft may be fixed in the center of the position sensor by a fastening pin, while the other side may be connected to the control valve.

Further, the output gear may be formed of a plastic material while the interference member may be formed to cover a part of the region at one side of the one surface of the output gear. Further, in order to compensate mass unbalance between an interference region in which the interference member of the output gear is present and a non-interference region in which the above interference member is not provided, at least one balance member may be provided in the output gear.

Further, the balance member may include a plurality of ribs that are extended in a diameter direction to adjoin one another at the other side of the other surface of the output gear, on which the interference member is not provided.

Further, the balance member may include a plurality of ribs that are extended in a diameter direction to adjoin one another at the other side of the one surface of the output gear, thereby being adjacent to the interference member.

Further, the balance member may be provided on one surface or the other surface of the output gear, wherein the balance member is prepared in a groove form inserted in a predetermined depth at one side overlapped with the interference member.

Further, the balance member may be provided to extend in a circumferential direction overlapped with the interference member.

Effects of Invention

According to the present invention with the configurations as described above, a single printed circuit board may be shared between the position sensor to sense the output unit and the EMC filter to filter EMC, thereby securing a space through simplification of parts and improving EMC properties. Consequently, it is possible to increase selection freedom for components such as a gear, a motor, etc., thereby improving space and design freedom while ensuring quality of control accuracy.

Further, since a balance member, which can compensate rotational unbalance of the output unit due to mass difference caused by the interference member made of a material different from that of the output unit, is provided, it is possible to improve deterioration in output performance due to right and left asymmetrical rotation. Therefore, the balance member can contribute to securing uniform sensitivity of the sensing unit to sense the interference member provided in the output unit, thereby further contributing to improvement of control performance.

DESCRIPTION OF DRAWINGS

FIG. 1 is a perspective view schematically illustrating an actuator for a vehicle coolant control valve according to a preferred embodiment of the present invention.

FIG. 2 is an exploded perspective view schematically illustrating the actuator for a vehicle coolant control valve according to the embodiment of the present invention shown in FIG. 1.

FIG. 3 is a perspective view of essential parts schematically illustrating a connection state in which the drive unit shown in FIG. 1 is ground-connected to the sensing unit.

FIG. 4 is a top view schematically illustrating the balance member present in the output gear shown in FIG. 1.

FIG. 5 is a top view schematically illustrating a variant of the balance member shown in FIG. 4

FIG. 6 is a top view schematically illustrating another variant of the balance member shown in FIG. 4.

DETAILED DESCRIPTION OF PREFERRED EMBODIMENTS OF INVENTION

Hereinafter, a preferred embodiment of the present invention will be described in detail with reference to the accompanying drawings. However, the spirit of the present invention is not limited to such embodiments as described above, instead, may be differently proposed by addition, alteration and deletion of components to implement embodiments of the present invention, which may also be included in the scope of the present invention.

As illustrated in FIGS. 1 and 2, the actuator for a vehicle coolant control valve according to a preferred embodiment of the present invention may include a drive unit 20, an output unit 30 and a sensing unit 40.

For reference, the drive unit 20, the output unit 30 and the sensing unit 40 may be installed inside a housing 10 and may be protected by a cover not shown in the figures.

The drive unit 20 may generate driving power for controlling a flow of the coolant for a vehicle. For this purpose, the drive unit 20 may include a driving source 21 and at least one transfer gear 24 to 27.

The driving source 21 may include a power generating means such as a motor rotating around a driving shaft 21a. The driving source 21 may have a cylindrical shape and may be installed in the housing 10 while being supported on a support plate 22. Further, the driving source 21 may be prepared to be adjacent to the sensing unit 40 described later, so as to preferably filter EMC (Electro-magnetic compatibility).

Further, the driving source 21 may be supported on a ground plate 23 having a rounding shape, as shown in FIGS. 2 and 3, wherein one side of the ground plate 23 is connected to the sensing unit 40 described later. Herein, the ground plate 23 may have a rounding shape and may be compressed on an outer surface of the driving unit 21 having a cylindrical shape, thereby securing a wide contact area.

Moreover, in conjunction with compression of the driving source 21, the ground plate 23 may be elastically deformed to thus secure contact points for grounding at both ends thereof. That is, the ground plate 23 having a rounding shape may induce ground-contact to at least two points, thereby improving ground quality of leakage current.

As such, by improving the contact ability of the driving source 21 to the ground plate 23, noise of the driving source 21 occurring through electro-magnetic control may be effectively ground-removed.

Meanwhile, the present embodiment illustrates that the driving power of the driving source 21 is transferred to the output unit 30 described later by the first to fourth transfer gears 24 to 27, however, is not particularly limited thereto. Instead, a variety of modified embodiments, wherein less than 4 or not less than 5 gears are provided between the driving source 21 and the output 30 to thus reduce a speed of the driving power in multiple stages and then transfer the same, are of course possible.

As shown in FIG. 1, the first transfer gear 24 may be gear-connected to the driving shaft 21a of the driving source 21 to thus rotate by the driving power. The first transfer gear 24 rotates around a first transfer axis 28, and a second transfer gear 25 may rotate while being coaxially connected to the first transfer axis 28. Herein, since a diameter of the second transfer gear 25 is smaller than that of the first transfer gear 24, a speed of the driving power of the driving source 21 may be reduced.

The second transfer gear 25 may be engaged with a third transfer gear 26 through gear teeth so as to transfer a rotational force of the second transfer gear 25 to the third transfer gear 26. The third transfer gear 26 rotates around a second transfer axis 29, and a fourth transfer gear 27 may rotate while being coaxially connected to the second transfer axis 29. Therefore, the fourth transfer gear may rotate in conjunction with a rotational force of the third transfer gear 26, wherein the fourth transfer gear 27 is engaged to the output unit 30 described later to thus finally transfer the rotational force thereto. Herein, since a diameter of the fourth transfer gear 27 is smaller than that of the third transfer gear 26, a speed of the driving power of the driving source 21 may further be reduced.

As described above, the driving power of the driving source 21 may be reduced in multiple stages through the first to fourth transfer gears 24 to 27, thereby finally transferring the driving power to the output unit 30.

The output unit 30 may drive the control valve (not shown) to selectively switch the coolant flow for a vehicle by the driving power provided by the drive unit 20. Herein, the output unit 30 may receive the driving power of the driving source 21 in sequential order through the first to fourth transfer gears 24 to 27. The output unit 30 may include an output gear 31 and an interference member 32.

The output gear 31 may rotate around an output shaft 31a by the driving power of the drive unit 20. The output gear 31 may rotate around the output shaft 31a and may be provided with gear teeth on an outer periphery thereof in order to be engage with the fourth output gear 31.

For reference, one side of the output shaft 31a of the output gear 31 may be supported on the sensing unit 40 described later, while the other side may be axially connected to the control valve not shown in the figures to thus output the driving power to the control valve (not shown).

The interference member 32 may be prepared to cover at least a part of the region on one surface of the output gear 31 and be communicated with rotation of the output gear 31. The interference member 32 may rotate in conjunction with the rotation of the output gear 31, thereby being sensed by the sensing unit 40 described later. Sensing of the interference member 32 by the sensing unit 40 will be described later in more detail along with the configuration of the sensing unit 40.

Meanwhile, as shown in FIG. 2, the interference member 32 may be formed as a metal plate in a half-moon shape. The interference member 32 is prepared to cover only a part of the region on one surface of the output gear 31 so that a mass on the partial region of the output gear 31 may be increased owing to features of the metal material.

More specifically, the output gear 31 prepared of a plastic material may have a total mass of about 11.6 g, a density of about 1460 kg/m$^2$ and a volume of 7.963e-6 m$^3$. Alternatively, the interference member 32 in a half-moon shape, which is made of a metal material including stainless steel (SUS), may have a total mass of about 3.2 g, a density of about 7900 kg/m$^2$ and a volume of 4.018e-7 m$^3$. Therefore, the output gear 31 may have a volume of about 19.8 times and a mass of about 3.6 times compared to the interference member 32. In this regard, the interference member 32 may be seated on one surface of the output gear 31 and cause rotational unbalance due to a different in weight balance between different materials of the output gear 31 and the interference member 32 when rotating the output gear 31.

Briefly, since a mass at one side of the output gear 31, on which the interference member 32 is present, is heavier than a mass at the other side, on which the interference member 32 is not provided, mass unbalance may occur between the one side of the output gear 31 and the other side thereof. If the output gear 31 rotates under such a state of mass unbalance, rotational unbalance such as asymmetric rotation of the output gear 31 may occur. Such mass unbalance of the output gear 31 causes deterioration in airtightness as well as rotation fault, hence entailing problems such as lowered output efficiency and leakage of coolant.

In order to prevent the rotational unbalance due to right and left mass unbalance of the output gear 31 provided with the interference member 32, the present embodiment may include at least one balance member 33.

As shown in FIG. 4, the balance member 33 is provided to compensate a difference between the mass at one side of the output gear 31, on which the interference member 32 is present, and the mass at the other side of the output gear 31, on which the interference member 32 is not provided. For this purpose, the balance member 33 may include a plurality of ribs at the other side of the output gear 31, which are in parallel to one another in a diameter direction. The present embodiment illustrated that the ribs are present in plural at the other surface of the output gear 31, on which the interference member 32 is not provided.

In other words, the balance member 33 may be formed as a plurality of ribs at the other side of the output gear 31 having relatively smaller mass, which are extended in a diameter direction to be in parallel to and adjacent to one another, so that a mass corresponding to the mass of the interference member 32 can be added to the other side of the output gear 31. Therefore, the mass at one side of the output gear 31, on which the interference member 32 is present, and the mass at the other side thereof, on which balance members 33 in the form of plural ribs are provided to be adjacent to but spaced from one another, are similar to each other so as to overcome mass unbalance of the output gear 31.

For reference, on one surface and the other surface of the output gear 31, a plurality of gear grooves 31b inserted in a determined depth on an outer surface of the output gear 31 may be provided to be spaced from one another in a circumferential direction. Among the plurality of gear grooves 31b, some gear grooves 31b positioned on the other surface rather than the one surface of the output gear 31 and disposed on the region not overlapped with the interference member 32 may be provided with a plurality of balance members 33.

Meanwhile, the configuration of the balance members 33 is not particularly limited to that illustrated in FIG. 4. For example, variants of the balance members 133, 233, as illustrated in FIGS. 5 and 6, may also be possible.

First, referring to FIG. 5, a balance member 133 in the form of inserted groove in a predetermined depth may be present in the region overlapped with the interference member 32 at the other surface of the output gear 31, on which the interference member 32 is not provided, rather than the one surface thereof. Herein, the balance member 133 may have a morphology extending in a circumferential direction overlapping with the interference member 32 and may be prepared at the other side and the other surface of the output gear 31, thereby reducing a mass at the other side of the output gear 31. Therefore, even if the interference member 32 is present at the other side of the output gear 31, a difference in mass between the one side and the other side of the output gear 31 may be compensated by the balance member 133.

For reference, the balance member 133 shown in FIG. 5 may be proposed as a variant wherein the balance member is provided at one side of one surface of the output gear 31, on which the interference member 32 is present, rather than the other surface of the output gear 31.

Further, referring to FIG. 6, it is possible to implement another variant wherein a plurality of balance members 233 in a rib form extending in a diameter direction so as to be adjacent to one surface of the output gear 31, on which the interference member 32 is present, may be provided. The plurality of balance members 233 in a rib form may compensate the mass of the output gear 31 in response to a mass of the interference member 32, thereby securing balance during rotation of the output gear 31.

The sensing unit 40 may sense an output condition of the output unit 30. Herein, the sensing unit 40 may sense rotation of the interference member 32 made of a metal material, which is communicated with the output gear 31, in addition, may filter electro-magnetic compatibility (EMC). That is, the sensing unit 40 may include a position sensor to sense the interference member 32 and an EMC filter wherein both components share a single printed circuit board PCB.

In this case, the sensing unit 40 is present to be adjacent to the driving source 21 and thus may easily filter EMC generated by the driving source 21. Further, as described above, the sensing unit 40 is connected to a ground plate 23 in close contact with the driving source 21 so as to efficiently reduce noise of the driving source 21.

Meanwhile, the sensing unit 40 may be provided with a connection line 41 for electrical connection to the driving source 21. Specifically, at least a pair of connection lines 41 may be prepared, wherein one side is connected to the driving source 21 while the other side is formed as a connection terminal 41a to be connected to the sensing unit 40. The connection terminal 41a of the connection line is inserted and connected in a connection hole 41b of the sensing unit 40 whereby the sensing unit 40 and the driving source 21 may be electrically connected to each other.

Herein, since the sensing unit 40 composed of a printed circuit board is connected to the driving source 21 through the connection line 41, an external power supply may be directly transferred and connected to the driving source 21. Further, since it is easy to connect the driving source 21 to the external power supply through the connection line 41, design position freedom of the driving source 21 may further be increased.

As described above, the sensing unit 40 may be provided as a single printed circuit board in order to perform a position sensing function to sense the interference member 32 and an EMC filtering function, simultaneously, so that it is advantageous to secure excellent EMC properties and improve selection freedom of components such as a gear, a motor, etc. In other words, because of the sensing unit 40 prepared as a single printed circuit board, space and design freedom can be secured while easily ensuring the quality of control accuracy.

Further, as illustrated in FIG. 3, one side of the output shaft 31a may be fixed in the center of a position sensor provided in the printed circuit board of the sensing unit 40 by means of a fastening pin 42. Herein, the other side of the output shaft 31a may be connected to the control valve (not shown). As such, since the output shaft 31a is fixed to the sensing unit 40 by the fastening pin 42, it is possible to prevent occurrence of a deviation due to distortion of the output shaft 31a by rotation of the output gear 31, thereby securing a predetermined sensing sensitivity.

A control operation of the actuator 1 for a vehicle coolant control valve with the above configuration according to the present invention will be described below with reference to FIGS. 1 and 2.

First, when the driving power is generated by the driving source 21, the driving power may be reduced in terms of speed and then transferred to the output gear 31 through the first to fourth transfer gears 24 to 27. The output gear 31 may be rotated by the transferred driving power and output the driving power to the control valve (not shown) present on the outside, thereby controlling a flow of coolant.

Meanwhile, the interference member 32 is provided on one surface of the output gear 31, and the interference member 32 is sensed by the sensing unit 40 facing the interference member. That is, the sensing unit 40 may sense the interference member 32 like a kind of position sensor. In this case, since the balance member 33 compensates a mass difference due to different materials between the output gear 31 and the interference member 32, the output gear 31 may maintain balance during rotation.

The sensing unit 40 may perform real-time sensing of a condition of the output gear 31 by the sensed interference member 32, while filtering EMS. At this time, the sensing unit 40 may be electrically inter-connected to the driving source 21 through a connection line 41, thereby supplying external power. Moreover, the driving source 21 may be ground-connected to the ground plate 23, and one side of the ground plate 23 is connected to the sensing unit 40, thereby filtering and removing noise of the driving source 21.

As described above, preferred embodiments of the present invention have been described with reference to the embodiments, however, it could be understood by those skilled in the art to which the present invention pertains that the present invention can be variously altered and modified within a range not departing from the spirit and scope of the present invention described in the following claims.

DESCRIPTION OF REFERENCE NUMERALS

1: Actuator for vehicle coolant control valve 10: Housing
20: Drive unit 21: Driving source 21a: Driving shaft 22: Support plate
23: Ground plate 24: First transfer gear
25: Second transfer gear 26: Third transfer gear
27: Fourth transfer gear 28: First transfer axis
29: Second transfer axis 30: Output unit
31: Output gear 31a: Output shaft
32: Interference member 33, 133, 233: Balance member
40: Sensing unit 41: Connection line

The invention claimed is:

1. An actuator for a vehicle coolant control valve, the actuator comprising:
a drive unit to generate driving power;
an output unit to drive a control valve, which selectively opens/closes ("switches") a coolant flow for a vehicle using the driving power provided by the drive unit; and
a sensing unit to sense an output condition of the output unit,
wherein the sensing unit is provided with a position sensor to sense a position of the output unit and an electro-magnetic compatibility (EMC) filter to filter EMC,
wherein the output unit includes:
an output gear that rotates around an output shaft by the driving power of the drive unit; and
an interference member, which is prepared to partially cover one surface of the output gear and to thus face the sensing unit and is communicated with rotation of the output gear, and
wherein the output gear and the interference member are made of different materials from each other.

2. The actuator according to claim 1, wherein the drive unit includes:
a driving source which is prepared to be adjacent to the sensing unit and has a cylindrical shape, and
at least one transfer gear which is connected to the driving source to reduce a speed of the driving power and transfer the same to the output unit.

3. The actuator according to claim 2, wherein the driving source is supported on a ground plate having a rounding shape and has at least two ground contact points when the driving source is compressed to the ground plate, wherein one side thereof is connected to the sensing unit.

4. The actuator according to claim 1, wherein at least one balance member is provided in the output gear in order to compensate mass unbalance between an interference region in which the interference member is present and a non-interference region in which the interference member is not provided.

5. The actuator according to claim 1, wherein the output gear is formed of a plastic material while the interference member is formed to cover a part of the region at one side of the one surface of the output gear,
wherein at least one balance member is provided at the other side of the output gear in order to compensate a difference between a mass at one side of the output gear, on which the interference member is present, and a mass at the other side of the output gear, on which the interference member is not provided.

6. The actuator according to claim 5, wherein the balance member includes a plurality of ribs that are extended in a diameter direction to adjoin one another at the other side of the other surface of the output gear, on which the interference member is not provided.

7. The actuator according to claim 5, wherein the balance member includes a plurality of ribs that are extended in a diameter direction to adjoin one another at the other side of the one surface of the output gear, thereby being adjacent to the interference member.

8. The actuator according to claim 1, wherein the output gear is formed of a plastic material while the interference member is formed to cover a part of the region at one side of the one surface of the output gear, and
wherein a balance member is provided on one surface or the other surface of the output gear, wherein the balance member is prepared in a groove form inserted in a predetermined depth at one side overlapped with the interference member.

9. The actuator according to claim 8, wherein the balance member is prepared to extend in a circumferential direction overlapped with the interference member.

10. The actuator according to claim 1, wherein the sensing unit includes one printed circuit board in which the position sensor and the EMC filter are present, and
wherein a driving source is connected to the printed circuit board through a connection line to thus be connected to an external power supply.

11. An actuator for a vehicle coolant control valve to control a flow of coolant, the actuator comprising:
a drive unit to generate driving power;
an output unit which is connected to the drive unit and drives a control valve using the driving power; and
a sensing unit including a printed circuit board to sense an output condition of the output unit,
wherein a position sensor to sense a position of the output unit and an electro-magnetic compatibility (EMC) filter to filter EMC share the printed circuit board of the sensing unit,
wherein the output unit includes:
an output gear that rotates around an output shaft by the driving power of the drive unit; and
an interference member, which is prepared to partially cover one surface of the output gear to thus face the printed circuit board and is communicated with rotation of the output gear, and
wherein the output gear and the interference member are made of different materials from each other.

12. The actuator according to claim 11, wherein the drive unit includes:
a driving source, which is prepared to be adjacent to the printed circuit board so as to be electrically connected to the printed circuit board and to generate the driving power; and
at least one transfer gear, which is connected to the driving source to reduce a speed of the driving power and transfer the same to the output unit,
wherein the driving source is connected to the printed circuit board through a connection line, thereby being connected to an external power supply.

13. The actuator according to claim 12, wherein the driving source is supported on a ground plate having a rounding shape, and has at least two ground contact points when the driving source is compressed to the ground plate, wherein one side thereof is connected to the printed circuit board.

14. The actuator according to claim 11, wherein one side of the output shaft is fixed in the center of the position sensor by a fastening pin, while the other side of the output shaft is connected to the control valve.

15. The actuator according to claim 11, wherein the output gear is formed of a plastic material, while the interference member is formed to cover a part of the region at one side of the one surface of the output gear, wherein at least one balance member is provided in the output gear, in order to compensate mass unbalance between an interference region in which the interference member is present and a non-interference region in which the interference member is not provided.

16. The actuator according to claim 15, wherein the balance member includes a plurality of ribs that are extended in a diameter direction to adjoin one another at the other side of the other surface of the output gear, on which the interference member is not provided.

17. The actuator according to claim 15, wherein the balance member includes a plurality of ribs that are extended in a diameter direction to adjoin one another at the other side of the one surface of the output gear, thereby being adjacent to the interference member.

18. An actuator for a vehicle coolant control valve, the actuator comprising:
  a drive unit to generate driving power;
  an output unit to drive a control valve, which selectively opens/closes ("switches") a coolant flow for a vehicle using the driving power provided by the drive unit; and
  a sensing unit to sense an output condition of the output unit,
  wherein the sensing unit is provided with a position sensor to sense a position of the output unit and an electro-magnetic compatibility (EMC) filter to filter EMC,
  wherein the drive unit includes:
  a driving source which is prepared to be adjacent to the sensing unit and has a cylindrical shape, and
  at least one transfer gear which is connected to the driving source to reduce a speed of the driving power and transfer the same to the output unit, and
  wherein the driving source is supported on a ground plate having a rounding shape and has at least two ground contact points when the driving source is compressed to the ground plate, wherein one side thereof is connected to the sensing unit.

19. The actuator according to claim 18, wherein the output unit includes an output gear that rotates around an output shaft by the driving power of the drive unit,
  wherein one side of the output shaft is fixed in the center of the position sensor by a fastening pin, while the other side of the output shaft is connected to the control valve.

* * * * *